United States Patent
Girish et al.

(10) Patent No.: US 8,179,419 B2
(45) Date of Patent: *May 15, 2012

(54) VIDEO CONFERENCING APPARATUS AND METHOD

(75) Inventors: Muthya K. Girish, Santa Clara, CA (US); Jay Fredrick Hamlin, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 733 days.

This patent is subject to a terminal disclaimer.

(21) Appl. No.: 12/126,038

(22) Filed: May 23, 2008

(65) Prior Publication Data

US 2008/0218583 A1    Sep. 11, 2008

Related U.S. Application Data

(63) Continuation of application No. 10/652,157, filed on Aug. 29, 2003, now Pat. No. 7,397,495.

(60) Provisional application No. 60/480,061, filed on Jun. 20, 2003.

(51) Int. Cl.
*H04N 7/14* (2006.01)

(52) U.S. Cl. ............... 348/14.08; 348/14.09; 348/14.01; 379/202.01

(58) Field of Classification Search ............... 348/14.01, 348/14.16, 211.4, 211.5, 373, 376; 396/448
See application file for complete search history.

(56) References Cited

U.S. PATENT DOCUMENTS

| | | | |
|---|---|---|---|
| 3,836,982 A * | 9/1974 | Schwartz | 396/467 |
| 5,534,914 A | 7/1996 | Flohr et al. | |
| 5,548,478 A | 8/1996 | Kumar et al. | |
| D374,022 S | 9/1996 | Meinzer | |
| 5,583,565 A | 12/1996 | Cortjens et al. | |
| 5,589,878 A | 12/1996 | Cortjens et al. | |
| 5,598,209 A | 1/1997 | Cortjens et al. | |
| D395,440 S | 6/1998 | Ogasawara et al. | |
| 5,801,919 A | 9/1998 | Griencewic | |
| 5,821,922 A | 10/1998 | Sellers | |
| 5,839,821 A * | 11/1998 | LeZotte | 362/253 |
| 5,855,343 A | 1/1999 | Krekelberg | |
| 5,872,922 A * | 2/1999 | Hogan et al. | 709/204 |
| 5,900,907 A | 5/1999 | Malloy et al. | |
| 5,999,207 A | 12/1999 | Rodriguez et al. | |
| 6,094,213 A | 7/2000 | Mun et al. | |

(Continued)

FOREIGN PATENT DOCUMENTS

EP    0781049 A2    6/1997

(Continued)

OTHER PUBLICATIONS

Office Action dated Aug. 27, 2007 in U.S. Appl. No. 10/652,157.

(Continued)

*Primary Examiner* — Melur Ramakrishnaiah
(74) *Attorney, Agent, or Firm* — Beyer Law Group LLP

(57) ABSTRACT

A video conferencing system having video and/or audio capture device for video and audio communications is disclosed. The video and audio capture device may include one or more switches for securely activating and deactivating the device. Furthermore, an indicator may be hard-wired to the video and/or audio components so to provide a true indication of when these components are on and off. The video and audio capture device may also be integrated into a single unit.

29 Claims, 8 Drawing Sheets

U.S. PATENT DOCUMENTS

| | | | |
|---|---|---|---|
| 6,118,653 A | 9/2000 | Kim | |
| 6,163,335 A | 12/2000 | Barraclough | |
| 6,172,703 B1 | 1/2001 | Lee | |
| D438,221 S | 2/2001 | Hedrick et al. | |
| D439,588 S | 3/2001 | Bergstrom et al. | |
| 6,243,819 B1 | 6/2001 | Jung | |
| 6,275,258 B1 | 8/2001 | Chim | |
| D454,898 S | 3/2002 | Ogasawara et al. | |
| 6,411,505 B1 | 6/2002 | DiFonzo et al. | |
| D463,467 S | 9/2002 | Sumita | |
| 6,453,336 B1 | 9/2002 | Beyda et al. | |
| 6,462,937 B1 | 10/2002 | Liao et al. | |
| 6,466,252 B1 | 10/2002 | Miyazaki | |
| 6,469,732 B1 | 10/2002 | Chang et al. | |
| 6,480,373 B1 | 11/2002 | Landry et al. | |
| 6,484,156 B1 | 11/2002 | Gupta et al. | |
| 6,489,986 B1 * | 12/2002 | Allen | 348/14.01 |
| 6,496,361 B2 | 12/2002 | Kim et al. | |
| D471,218 S | 3/2003 | Sekine | |
| D476,345 S | 6/2003 | Phelps et al. | |
| D477,622 S | 7/2003 | Phelps et al. | |
| 6,587,151 B1 | 7/2003 | Cipolla et al. | |
| D482,377 S | 11/2003 | Tajima | |
| 6,659,516 B2 | 12/2003 | Wang et al. | |
| 6,693,663 B1 | 2/2004 | Harris | |
| 6,731,324 B2 | 5/2004 | Levy | |
| 6,771,396 B1 | 8/2004 | Cheatle et al. | |
| 6,784,916 B2 | 8/2004 | Smith | |
| 6,788,529 B2 | 9/2004 | Homer et al. | |
| 7,061,536 B2 | 6/2006 | Cha | |
| 7,126,816 B2 | 10/2006 | Krah | |
| 7,170,551 B2 | 1/2007 | Fichtner | |
| 2001/0009439 A1 | 7/2001 | Hwang | |
| 2001/0018349 A1 | 8/2001 | Kinnuen et al. | |
| 2001/0056460 A1 | 12/2001 | Sahota et al. | |
| 2002/0044201 A1 | 4/2002 | Alexander et al. | |
| 2002/0057347 A1 | 5/2002 | Urisaka et al. | |
| 2002/0149672 A1 | 10/2002 | Clapp et al. | |
| 2002/0198962 A1 | 12/2002 | Horn et al. | |
| 2003/0161093 A1 | 8/2003 | Lam et al. | |
| 2004/0017938 A1 | 1/2004 | Cooper et al. | |
| 2004/0257431 A1 | 12/2004 | Girish et al. | |
| 2004/0257432 A1 | 12/2004 | Girish et al. | |
| 2005/0128284 A1 | 6/2005 | Hoffer et al. | |
| 2005/0168924 A1 | 8/2005 | Wu et al. | |

FOREIGN PATENT DOCUMENTS

| | | |
|---|---|---|
| JP | 03190139 | 7/1991 |
| JP | 405037836 A | 12/1993 |
| JP | 08238627 | 8/1996 |
| JP | 10073754 A * | 3/1998 |
| JP | 410073754 A | 3/1998 |
| JP | 11111690 | 4/1999 |
| JP | 2000307913 A | 2/2000 |
| JP | 2000-092356 | 3/2000 |
| JP | 2002-238040 | 8/2002 |
| JP | 2002/238040 | 8/2002 |
| WO | 99/60788 | 11/1999 |

OTHER PUBLICATIONS

Office Action dated Jan. 8, 2007 in U.S. Appl. No. 10/652,157.
Office Action dated Sep. 8, 2006 in U.S. Appl. No. 10/652,157.
Office Action dated Mar. 29, 2006 in U.S. Appl. No. 10/652,157.
Office Action dated Oct. 4, 2005 in U.S. Appl. No. 10/652,157.
Office Action dated Sep. 25, 2007 in U.S. Appl. No. 10/651,918.
Office Action dated Mar. 8, 2007 in U.S. Appl. No. 10/651,918.
Proshare® Video Conferencing System, Cisco Whitepaper, Cisco Systems, Inc., http://www.intel.com/support/proshare/8161.htm, downloaded Jun. 24, 2003, pp. 1-10.
Computers/Input Devices/Web Cameras; www.shopping.com, downloaded on Apr. 7, 2004.
International Search Report dated Nov. 16, 2004 in PCT Application No. PCT/US2004/016635.
Written Opinion dated Nov. 16, 2004 in PCT Application No. PCT/US2004/016635.
Sony VAIO C1MV Picturebook with TM5800 Crusoe: http://www.pcstats.com/articieview.cfm?articleID=857; downloaded on Oct. 15, 2004.
Office Action dated Mar. 30, 2007 in U.S. Appl. No. 11/498,451.
Office Action dated Nov. 16, 2007 in U.S. Appl. No. 11/498,451.
Office Action dated Feb. 26, 2008 in U.S. Appl. No. 11/498,451.
International Search Report dated Nov. 15, 2005 in PCT Application No. PCT/US04/15916.
Written Opinion dated Nov. 15, 2005 in PCT Application No. PCT/US04/15916.
Notice of Allowance dated Feb. 22, 2008 in U.S. Appl. No. 10/652,157.
Office Action dated Sep. 5, 2008 in U.S. Appl. No. 11/498,451.

* cited by examiner

LOGIC

VIDEO CONFERENCING APPARATUS AND METHOD

CROSS REFERENCE TO RELATED APPLICATION

This application is a continuation of U.S. patent application Ser. No. 10/652,157, filed Aug. 29, 2003, entitled "VIDEO CONFERENCING APPARATUS AND METHOD," which in turn claims the priority of Application No. 60/480,061, filed on Jun. 20, 2003 and entitled "SYSTEM AND METHOD FOR ENHANCED VIDEO CONFERENCING", both of which are incorporated herein by reference.

BACKGROUND OF THE INVENTION

1. Field of the Invention

The invention generally pertains to video conferencing and, more particularly, to a video and/or audio capture device for video and audio communications.

2. Description of the Related Art

Video conferencing generally refers to a live connection between two or more participants in separate locations for the purpose of audio and video communication. At its simplest, video conferencing provides transmission of images and text between two locations. At its most sophisticated, it provides transmission of full motion video images and high quality audio between two or more locations. Video conferencing may be performed a variety of ways. In most cases, each participant has a display, video camera, microphone and speaker. As the two participants communicate, the sound from their voices are collected by their respective microphones and delivered to the other's speaker. In addition, whatever images appear in front of the video camera are collected by the video camera and delivered to the other participant's display. Video conferences may be performed using computer networks, ISDN telecommunication links, and the like.

FIG. 1 is an exemplary diagram of a video conferencing system 10. The system 10 includes at least two workstations 12 and 14 that are connected via a communication network 16. By way of example, the network may correspond to closed network (such as a LAN), a public network (such as the Internet or phone lines), and the like. The workstations 12 and 14 may be a receiver, transmitter or both (transceiver). In most cases, both workstations 12 and 14 are transceivers so that they can communicate back and forth (e.g., send and receive data). Although the workstations 12 and 14 may be widely varied, in FIG. 1 each workstation 12 and 14 includes a computer 18 and a display screen 20. The computer 18 is a host device for separate peripheral devices such as a camera 22, a microphone 24 and a speaker 26. By way of example, the computer 18 may be an Apple based or PC based computer and the camera may be a webcam or netcam. The relationship between the computer and the peripheral devices is typically master-slave where the master controls the slaves. For example, the computer determines when the peripheral devices are activated and deactivated.

During video conferencing, the computers 18 are linked via the network 16 such that data generated by the cameras 22 (e.g., video or images) and microphones 24 (e.g., audio) may be transmitted to the other computer 18. The computer 18 typically executes the data transmissions under the control of software 28. The software 28 may include conferencing software that helps link the computers together and to control the transmission and reception of data associated with the peripheral devices (e.g., may help broadcast video camera images to a known recipient or indiscriminately to a web page). In most cases, the conferencing software 28 requests data from the camera 22 and microphone 24 and thereafter causes the data to be transmitted to the other computer. When the transmitted data is received by the other computer 18, it is output via the display screen 20 (e.g., video or images) and speaker 26 (e.g., audio).

Unfortunately, there are problems associated with conferencing systems such as those described above. One of the problems is privacy. In particular, a user may be watched or listened to by another user without knowledge that these events are occurring. For example, one of the users may forget to shutdown the conferencing software thus enabling another user to use the data being generated by the video camera and microphone. This can occur when the user fails to fully close the software that controls the camera or microphone. For example, the software is not closed if its associated window is merely minimized. In order to overcome this, the video camera or microphone may include a light emitting diode (LED) to alert the unsuspecting user that the system is still active. That is, the LED provides a visual indication to the user, i.e., turns on when the conferencing system is active and turns off when the conferencing system is deactivated. Unfortunately, however, the LED is controlled by the conferencing software and thus the LED can be tricked into indicating that the system is off when it is actually still on. This case is worse than not having an LED because the user relies on the LED to give accurate information. There simply is no true indication that the transmissions have been shut down.

In lieu of the above, there is a need for an improved audio/video capture device.

SUMMARY OF THE INVENTION

A video conferencing system having video and/or audio capture device for video and audio communications is disclosed. The video and audio capture device may include one or more switches for securely activating and deactivating the device. Furthermore, an indicator may be hard-wired to the video and/or audio components so to provide a true indication of when these components are on and off. The video and audio capture device may also be integrated into a single unit.

The invention relates, in one embodiment, to a data conferencing apparatus. The apparatus includes a data capture device configured to capture data. The device further includes an on air indicator that is hard wired to the data capture device. The on air indicator informs a user when the data capture device is activated and deactivated. The data may be audio and/or video data. In some cases, the apparatus further includes a switch mechanism for activating and deactivating the data capture device.

The invention relates, in another embodiment, to a video conferencing system. The system includes a host device capable of processing and outputting data. The system also includes a data capture device operatively coupled to the host device. The data capture device is configured to collect data and to supply the data to the host device. The data capture device includes a switch mechanism for performing an action in the host or data capture device.

The invention relates, in another embodiment, to a computer-operated data capture device that combines multiple data collecting components into a single unit. The device includes an audio capture device configured to collect audio data. The device also includes an image capture device configured to collect image data. The device further includes an indicator unit configured to indicate when audio or image data is being collected by the audio and image capture devices.

The invention relates, in another embodiment, to a video conferencing apparatus. The apparatus includes a camera configured to capture images. The apparatus includes a base that internally encloses the camera. The apparatus also includes an iris cap movable relative to the base. The iris cap is configured to open and close an iris associated with the camera. The iris prevents image capture when closed and allowing image capture when opened. The iris also provides visual indication to a user when the camera is capable of capturing images and when the camera is no longer capable of capturing images.

The invention relates, in another embodiment, to a computer based data capture method. The method includes providing a data capture device for collecting data, the data capture device having a switch mechanism. The method also includes monitoring the status of the switch mechanism. The method further includes activating the data capture device when the switch is in a first condition such that the data capture device collects data, and deactivating the data capture device when the switch is in a second condition such that the data capture device stops collecting data. The method additionally includes always producing visual indicia on the outer periphery of the data capture device when the data capture device is activated. Moreover, the method includes transmitting the collected data to a computer when the data capture device is activated.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known parts or operations have not been described in detail in order not to unnecessarily obscure the present invention.

The invention generally pertains to a video and/or audio capture device for video and audio communications. The video and/or audio capture device is particularly well suited for video conferencing applications. Embodiments of the invention may incorporate one or more of the following aspects. One aspect of the invention relates to an integrated video and audio capture device. By integrated, it is generally meant that the video and audio components are disposed in a single unit. Another aspect of the invention relates to a light indicator that is hard-wired to the video and/or audio components so that it provides a true indication of when these components are on and off (e.g., hardware controlled rather than software controlled). Yet another aspect of the invention relates to a video and audio capture device that includes one or more switches for activating and deactivating the device. Yet another aspect of the invention relates to a video capture device that includes an iris that may be opened and closed. When the iris is opened, the video capture device may capture video and it also gives a visual indication to the user that the video capture may be on. When closed, the video capture device is prevented from capturing video and it also gives a visual indication to the user that the video capture is off. In some cases, the iris may act as the switch for activating and deactivating the device. Moreover, another aspect of the invention relates to a capture device that initiates requests to the host device (e.g., not a slave).

These and other embodiments of the invention are discussed below with reference to FIGS. 2-9. However, those skilled in the art will readily appreciate that the detailed description given herein with respect to these figures is for explanatory purposes as the invention extends beyond these limited embodiments.

Figure 1:
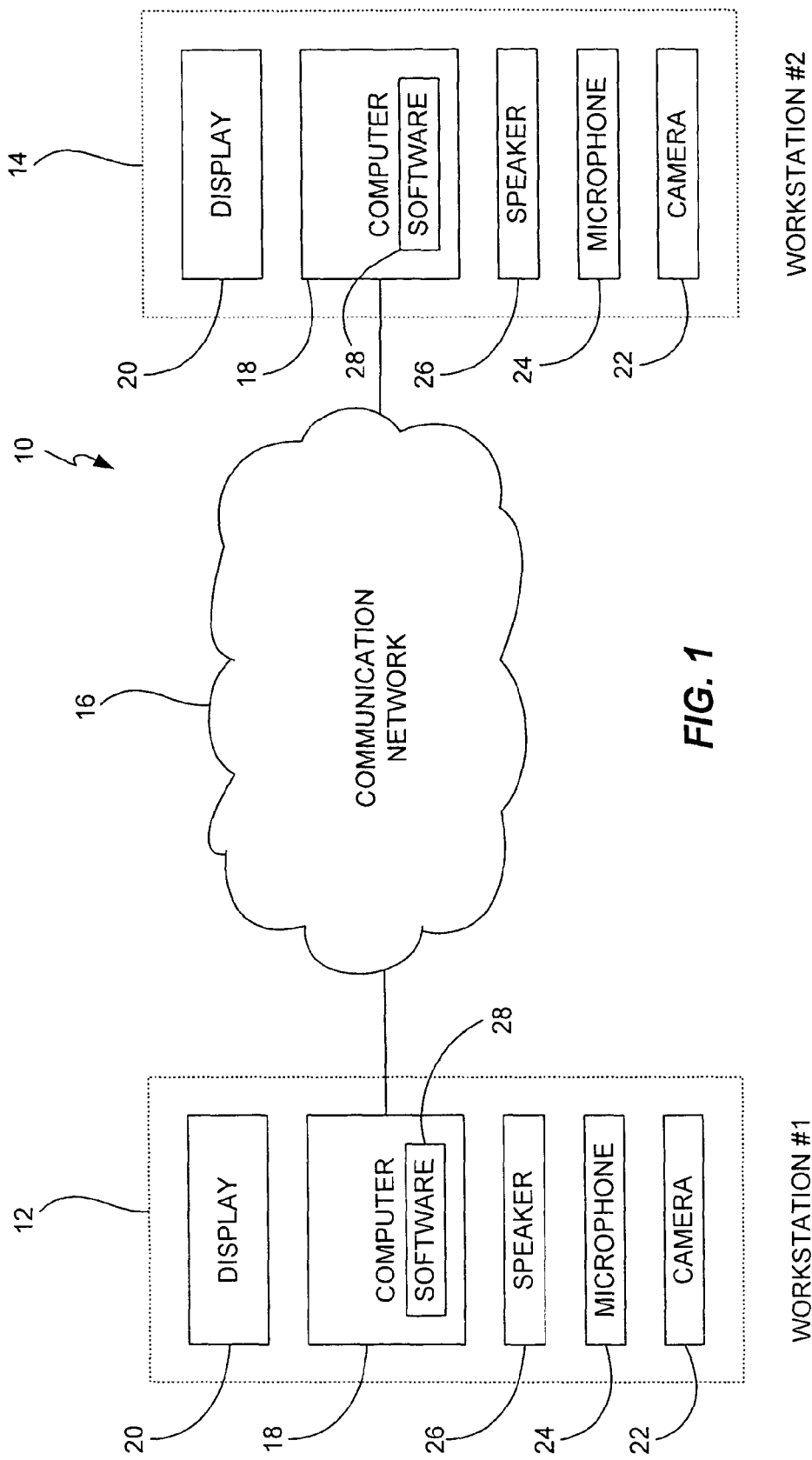
FIG. 1 is an exemplary diagram of a video conferencing system.
Figure 2:
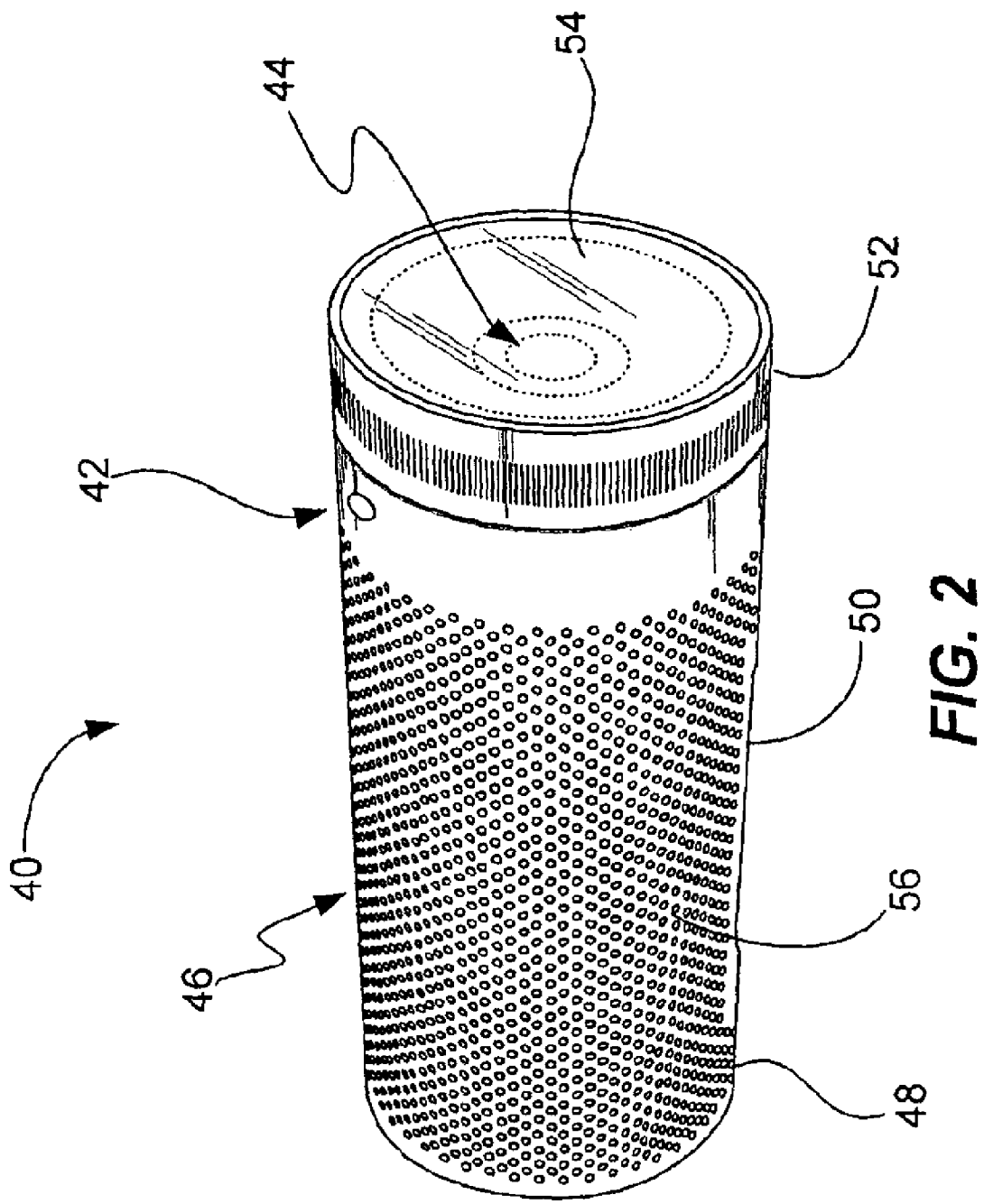
FIG. 2 is a perspective view of a data capture device, in accordance with one embodiment of the present invention.

FIG. 2 is a perspective view of a data capture device 40, in accordance with one embodiment of the present invention. The data capture device 40 is configured to collect data for a host device such as a computer. For example, it may be configured to collect audio data, video data, and/or the like. In the case of audio data, the data capture device 40 may include a microphone and in the case of video data the data capture device 40 may include a camera. The microphone may produce a live audio stream. The camera, on the other hand, may produce a live video stream or images at intervals. The data capture device 40 may be connected to the host device through wireless or wired connections. The host device itself is typically connected to a network (e.g., Internet) so that the data collected by the data capture device 40 can be sent to another location such as a remote participant or a web page.

In the illustrated embodiment, the data capture device 40 corresponds to an audio/video capture device that combines a camera 44 and one or more microphones 46 into a single unit. Although integrated into a single unit, the camera 44 and microphone 46 may be integrally connected such that they only work together or they may be separate and distinct components that can be used independently. When independent, the user may stop video capture without disconnecting audio capture or the user may stop audio capture without disconnecting video capture.

In order to ensure privacy, the data capture device 40 also includes an indicator assembly 42 configured to alert a user of the data capture device 40 when the data collecting components of the data capture device 40 are collecting data. The indicator unit is hard-wired to one or more of the data collecting component(s) (e.g., camera and/or microphone) so that the indicator assembly 42 is on when the data collecting components are truly on and the indicator unit is off when the data collecting components are truly off. The term "hard-wired" herein generally refers to connections that are done through hardware. There is no software control with components that are hard-wired together. The indicator assembly 42 may be widely varied. For example, it may include one or more auditory indicators (e.g., buzzer), visual indicators (e.g., light source) and/or touch indicators (e.g., vibrator). The indicators may be hard-wired separately to each component and/or they may be hard-wired integrally to multiple components. When hard-wired separately, each data collecting component may include its own indicator. For example, the indicator assembly 42 may include a first indicator for the camera 44 and a second indicator for the microphone 46. When hard-wired integrally, the data collecting components use the same indicator or set of indicators. For example, the indicator assembly 42 may include one or more indicators dedicated to both the camera 44 and microphone 46. In some cases, the indicator assembly 42 may include multiple indicators or multiple modes (e.g., different colors, sounds) for representing the different conditions of the camera 44 and microphone 46 (e.g., camera on/microphone on, camera on/microphone off, camera off/microphone on, camera off/microphone off).

In the illustrated embodiment, the camera 44, microphone 46 and indicator assembly 42 are integrally connected (e.g., hard-wired) thus operating together as a single system. In this embodiment, the indicator assembly 42 includes a single light indicator for visually indicating whether or not the camera and microphone are active (e.g., on-air). For example, the indicator unit may include a light emitting diode (LED) that is hardwired to both the camera and the microphone. The LED is configured to illuminate when the camera and microphone are on and stop illuminating when the camera and microphone are off.

As shown in FIG. 2, the video/audio capture device 40 includes a body 48 that encloses internally various electrical components (including integrated circuit chips and other circuitry) to provide operations for the video/audio capture device 40. The integrated circuit chips and other circuitry contained within the body 48 typically include the components of the indicator assembly 42, camera 44, and microphone 46. For example, the components of the indicator assembly 42 may include a light emitting diode (LED) and a light guide, components of the camera may include image sensors (e.g., charge coupled device (CCD) or complimentary oxide semiconductor (CMOS)) and/or optics (e.g., lenses, splitters, filters), and components of the microphone (e.g., carbon, dynamic, ribbon, condenser, crystal, etc.) may include diaphragms, amplifiers, digital signal processors (DSP), etc. The circuitry may also include microprocessors (e.g., CPU), memory (e.g., ROM, RAM), circuit boards, various input/output (I/O) support circuitry and/or the like.

The body 48 may also include one or more data ports (not shown) capable of receiving a data connector/cable assembly configured for transmitting and receiving data to and from the host device. By way of example, the data port may be used to download audio, video and other images to the host device. The data port may be widely varied. For example, the data port may be a PS/2 port, a serial port, a parallel port, a USB port, a FireWire port and/or the like. In some cases, the data port may be a radio frequency (RF) link or optical infrared (IR) link to eliminate the need for a cable. Although not shown in FIG. 2, the body 48 may also include a power port that receives a power connector/cable assembly configured for delivering power to the device. In some cases, the data port may serve as both a data and power port. In one particular embodiment, the data port is a FireWire port having both data and power capabilities. The FireWire port is configured to receive a removable FireWire cable that can also be removably coupled to the host device. Alternatively, the cable may be permanently coupled to the body.

In addition to housing the above components, the body 48 also defines the shape or form of the video/audio capture device 40. That is, the contour of the body 48 may embody the outward physical appearance of the video/audio capture device 40. The shape of the body 48 may be widely varied. In the illustrated embodiment, the body 48 has a cylindrical shape. The components of the body 48 may also be widely varied. In the illustrated embodiment, the body 48 includes a base 50 and a cap 52. The cap 52 is located at one end of the body 48. Although not required, the cap 52 includes a window 54 that acts as a protective layer and a light conduit to the camera 44 enclosed within the body 48. The base 50, on the other hand, includes a grill portion 56 having a plurality of holes that provide not only air circulation for cooling but also a sound conduit to the microphone 46 enclosed within the body 48.

The cap 52 may be movable relative to the base 50 (e.g., slidable, rotatable, etc.) so as to perform a control function associated with the video/audio capture device 40 and/or the host device to which the video/audio capture device 40 is connected. By way of example, the moving cap 52 may be configured to adjust an aperture associated with the camera 44, turn on/off portions of the video/audio capture device 40 and/or launch/close a program running on the host device.

Figure 3:
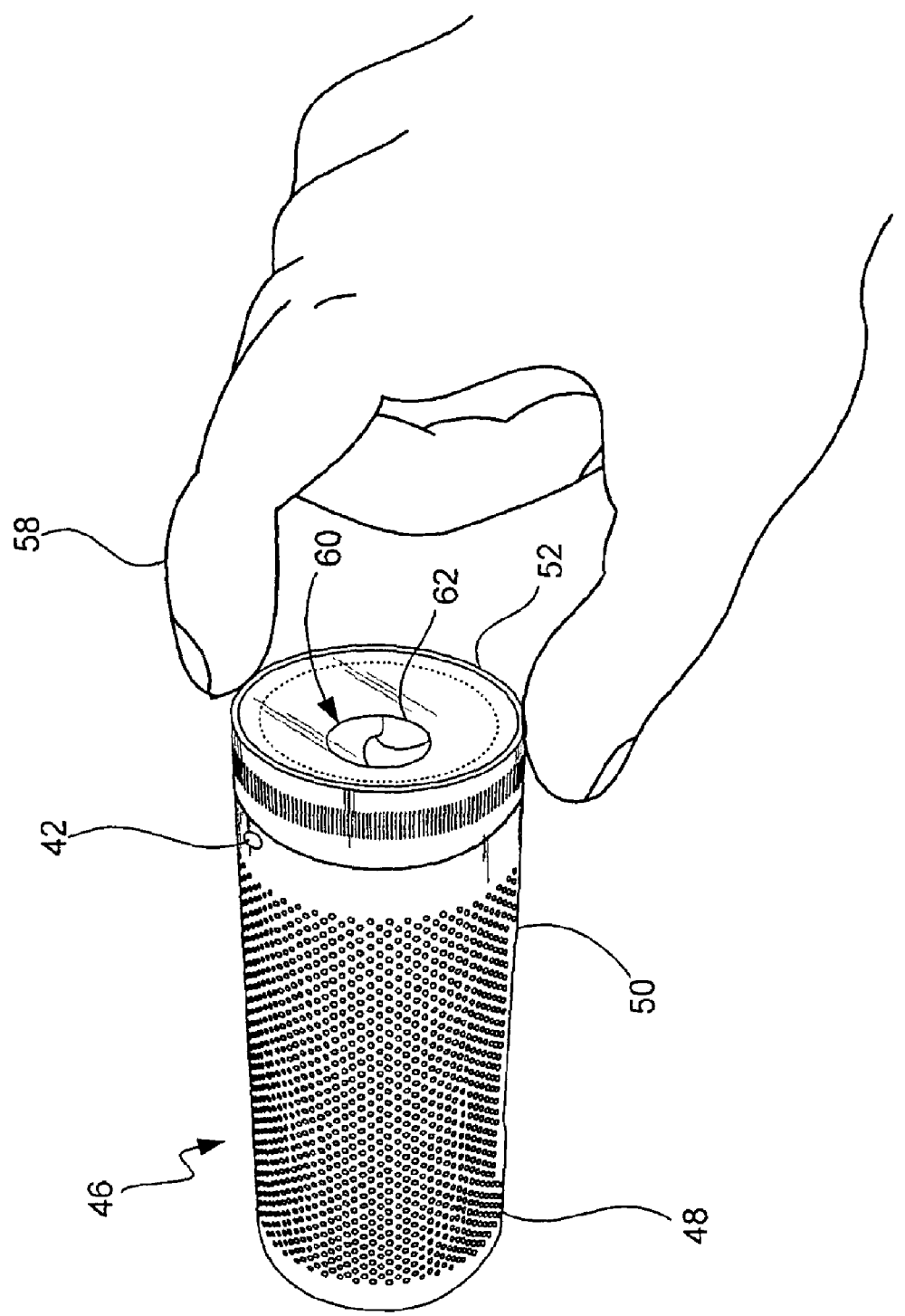
FIG. 3 is perspective view of a data capture device with a control switch, in accordance with one embodiment of the present invention.

In FIG. 3, the cap 52 is rotatably coupled to the base 50. As such, when a user swirls their fingers 58, the cap 52 is capable of rotating between a first and a second position so as to implement the control function(s). In one embodiment of FIG. 3, the rotating cap 52 is configured to control an iris diaphragm 60. The iris diaphragm 60 is configured to increase or decrease the size of the aperture of the camera 44. This may be done to control the amount of light into the camera 44 or to allow video capture when opened and prevent video capture when closed.

Figure 4A:
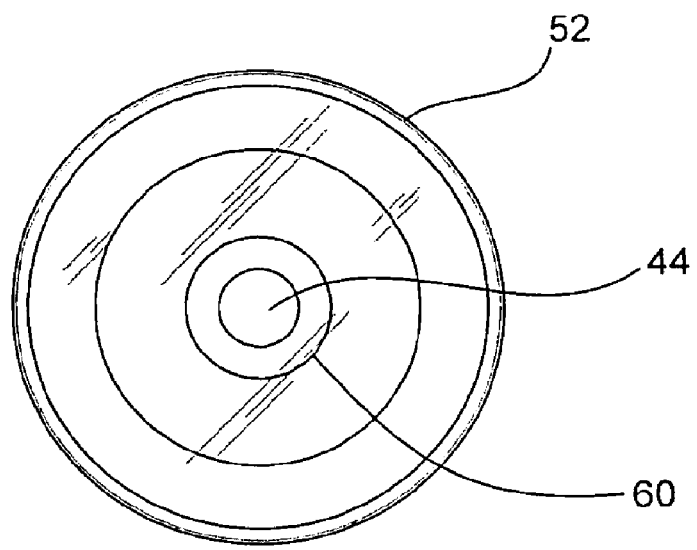
FIGS. 4A and 4B are front views of the data capture device showing different conditions thereof, in accordance with one embodiment of the present invention.
Figure 4B:
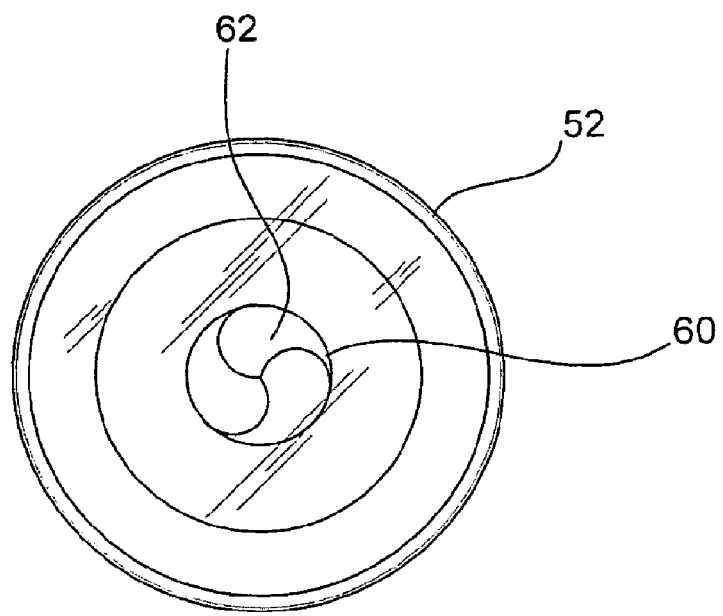

As shown in FIGS. 4A and 4B, according to one embodiment, the iris diaphragm 60 generally includes a plurality of moving plates 62 that can fold in and expand out in order to shrink or widen the diameter of the aperture. A small diameter typically captures less light and a large diameter typically captures more light. In one particular implementation, the rotating cap 52 only has an open position and a close position. In the open position, the plates 62 of the iris diaphragm 60 move to a position that opens the aperture and thus video capturing may be performed (as shown in FIG. 4A). In the close position, the plates 62 of the iris diaphragm 60 move to a position that closes the aperture and thus video capturing cannot be performed (as shown in FIG. 4B).

As should be appreciated, the plates 62 can also provide a visual indication to a user whether or not the video/audio capturing device 40 is capable of transmitting video, i.e., if opened the user knows that video/audio capturing device has the ability to collect video and if closed the user knows that video/audio capturing device doesn't have the ability to collect video. In one implementation, the plates 62 are formed from a color that contrasts the color of the rest of the components of the camera 44 to further enhance the visibility when opened and closed. For example, the plates may be white or gray when the camera components are black.

In another embodiment of FIG. 3, the cap 52 is configured to generate control signals when rotated. The control signals may be used to control features of the audio/video capture device 40 or the host device that is connected to the audio/video capture device 40. In essence, the cap 52 acts as a mechanical dial that generates a signal when moved from a first position to a second position. The signals may be generated by mechanical, electrical or optical switching components incorporated into the body (e.g., tact switches, capacitance sensors, optical sensors.)

In one implementation, the signal(s) are used to turn the video/audio capturing device 40 on and off. That is, when the cap 52 is rotated to a first position (e.g., close position), the indicator unit/camera/microphone are deactivated such that the indicator assembly 42 is shut off and the camera 44 and microphone 46 stop collecting sounds and images. On the other hand, when the cap 52 is rotated to a second position (e.g., open position), the indicator assembly 42 is turned on and the camera 44 and microphone 46 are activated such that they collect sounds and images. As should be appreciated, because the indicator assembly 42 is hard wired to the camera 44 and microphone 46, the user cannot be tricked into thinking that the camera 44 and microphone 46 are off when in reality they are still on (e.g., no software control). The light indicator gives a true reading to the user whether or not data is being collected.

In another implementation, the signals generated by the rotating cap 52 are configured to launch/close a program stored in the host device. For example, when rotated, the audio/video capture device 40 may send a signal to launch/close video conferencing software stored on the host device.

Figure 5:
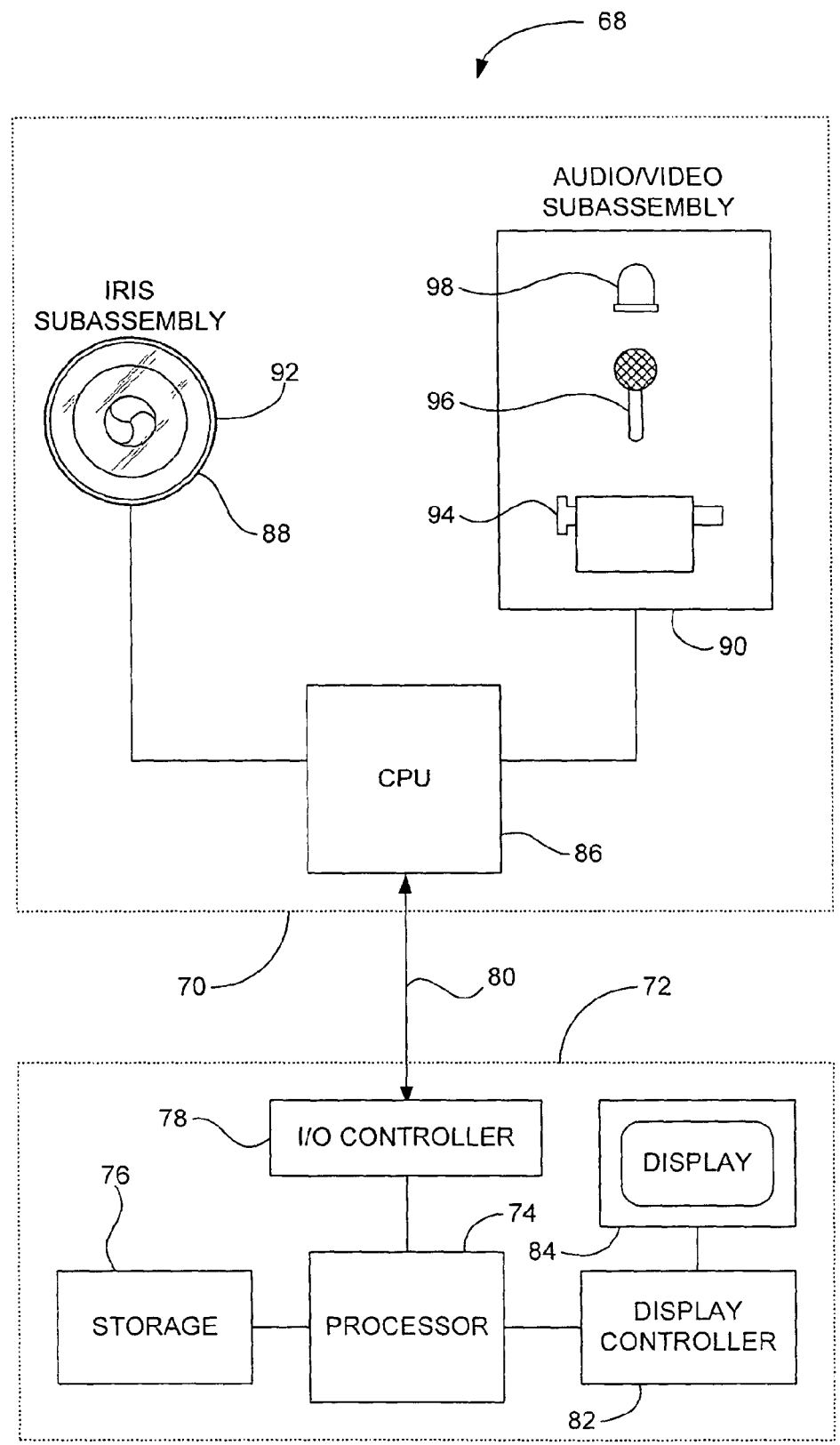
FIG. 5 is a simplified block diagram of an audio/video capture device, in accordance with one embodiment of the present invention.

FIG. 5 is a block diagram of a computing system 68, in accordance with one embodiment of the present invention. The system 68 includes an audio/video capturing device 70 and a host device 72. The audio/video capturing device 70 and the host device 72 may be widely varied. By way of example, the audio/video capturing device 70 may generally correspond to the device shown in FIGS. 2-4. In addition, the host device 72 generally corresponds to a computer, including but not limited to, a desktop computer, laptop computer, handheld computer, and the like.

The host device 72 is typically configured to control information between the audio/video capture device 70 and the host device 72. The host device 72 may be configured to request audio and video data from the audio/video capture device 70 and to output the received data via a speaker and/or a display associated with the host device 72. By way of example, this may be accomplished using a video conferencing program, which is stored on the host device 72 and which is typically accessed through a graphical user interface (GUI). Alternatively or additionally, the audio/video capture device 70 may be configured to control information between the audio/video capture device 70 and the host device 72. For example, the host device 72 may be configured to receive instructions from the audio/video capture device 70. The instructions may be used to perform actions in the host device 72. By way of example, the audio/video capture device 70 may generate a control signal that can be used by the host device 72 to launch and/or close the video conferencing program. The control signal may also be used to perform other actions such as those associated with the video conferencing program (e.g., focus, zoom, volume control, etc).

As shown in FIG. 5, the host device 72 generally includes a processor 74 configured to execute instructions and to carry out operations associated with the computing system 68. For example, the processor 74 may control the reception and manipulation of input and output data between components of the computing system 68. The processor can be a single-chip processor or can be implemented with multiple components. In most cases, the processor 74 together with an operating system operates to execute computer code and produce and use data. The computer code and data may be in the form of software that works with the audio/video capturing device 70. For example, the software may send audio and video data requests to the audio/video capturing device 70. The computer code and data may reside within a program storage area 76 that is operatively coupled to the processor 68. Program storage area 76 generally provides a place to hold data that is being used by the computing system 68. By way of example, the program storage area 76 may include semiconductor memory, hard disk drive and/or the like. The computer code and data could also reside on a removable program medium and loaded or installed onto the computer system when needed. Removable program mediums include, for example, CD-ROM, PC-CARD, floppy disk, magnetic tape, and a network component.

The host device 72 also includes an input/output (I/O) controller 78 that is operatively coupled to the processor 72. The (I/O) controller 78 may be integrated with the processor 74 or it may be a separate component as shown. The I/O controller 78 is generally configured to control interactions with one or more I/O devices that can be coupled to the host device 72. The I/O controller 78 generally operates by exchanging data between the host 72 and the I/O devices that desire to communicate with the host 72. By way of example, the I/O devices may be internal or peripheral devices such as memory, disk drives, keyboards, mice, printers, scanners, speakers, video cameras, MP3 players and the like. The I/O devices may also be network-related devices such as network cards or modems. In the illustrated embodiment, the I/O devices coupled to the host 72 include at least the audio/video capturing device 70. Furthermore, the I/O devices and the host 72 typically communicate through a data link 80. The data link 80 may be a one way link or two way link. In some cases, the I/O devices may be connected to the I/O controller 78 through wired connections. In other cases, the I/O devices may be connected to the I/O controller 78 through wireless connections. By way of example, the data link 80 may correspond to FireWire, USB, IR, RF, Bluetooth or the like.

The host 72 also includes a display controller 82 that is operatively coupled to the processor 72. The display controller 82 may be integrated with the processor 72 or it may be a separate component as shown. The display controller 82 is configured to process display commands to produce text, graphics, images and video on a display device 84. The display device 84 may be integral with the host 72 or it may be a separate component of the host 72. By way of example, the display device 84 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like.

The audio/video capturing device 70, on the other hand, generally includes a controller or CPU 86, an iris subassembly 88, and an audio/video subassembly 90. The CPU 86 is configured to execute instructions and to carry out operations associated with the audio/video capturing device 70. For example, using instructions retrieved for example from memory or host device, the CPU 86 may control the reception and manipulation of input and output data between components of the audio/video capturing device 70 and/or the host device. In most cases, the CPU 86 acquires the data from the audio/video subassembly 90 and supplies the acquired data to the processor 74 of the host device 72. For example, when there is a request, the CPU 86 may release the data being collected by the audio/video capturing device 70 to the software of the host device 72. The request is typically initiated by a user operating the host device 72. The CPU 86 is generally configured to send raw data to the processor 74 so that the processor 74 processes the raw data. For example, the processor 74 receives data from the CPU 86 and then determines how the data is to be used within the computing system 68 (e.g., compression). Alternatively, the CPU 86 may be configured to process the raw data (entirely or portions thereof).

The iris sub assembly 88 acts as a switch (and in fact may be a switch) that informs the CPU 86 of the user's desires with regards to operating the audio/video capturing device 70 or the host device 72. For example, the iris subassembly 88 may include a rotating cap 92 that moves between an open position and a closed position in order to generate control signal(s). In one embodiment, the signal is used by the CPU 86 to activate and deactivate the audio/video subassembly 90. In another embodiment, the signal is used by the CPU 86 to activate the software stored in the host device 72.

The audio/video subassembly 90 includes a camera 94, microphone 96 and light emitting diode 98 that are hard wired together to form an integrated unit. As such, when the CPU 86 informs the audio/video subassembly 90 to turn off, all the components of the audio/video subassembly 90 turn off, and when the CPU 86 informs the audio/video subassembly 90 to turn on, all the components of the audio/video subassembly 90 turn on. When turned on, the audio/video subassembly 90 collects visual data through the camera 94, audio data through the microphone 96 and emits light via the light emitting diode 98 to indicate that audio and visual data are being collected. The collected data is sent to the host device 72.

Figure 6A:
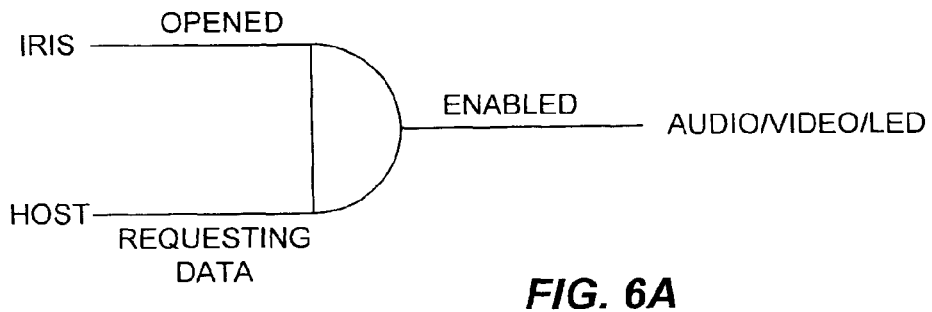
FIGS. 6A-D are logic diagrams showing events of the audio/video capture device, in accordance with one embodiment of the present invention.
Figure 6B:
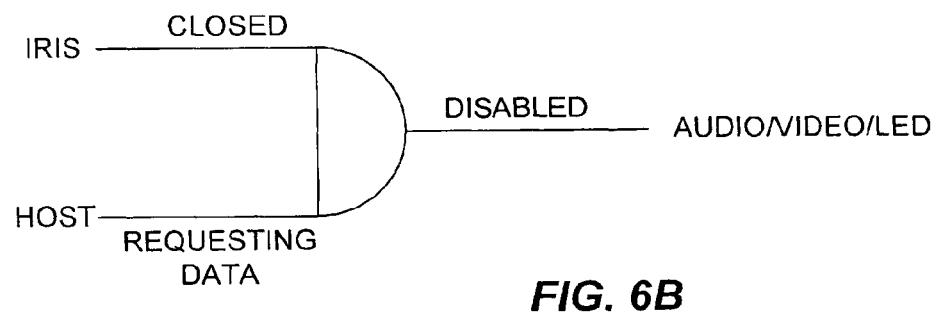
Figure 6C:
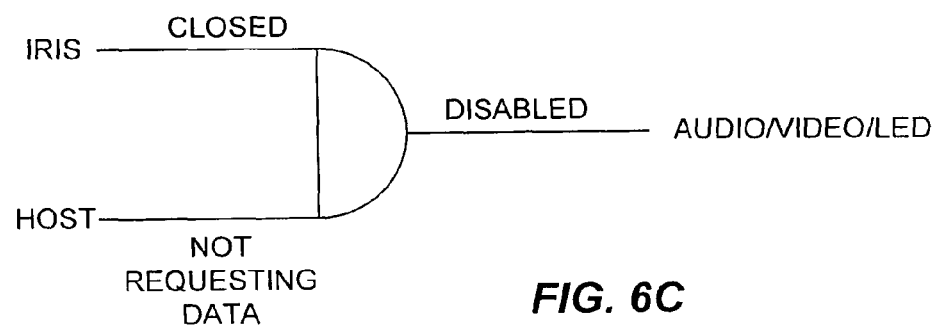
Figure 6D:
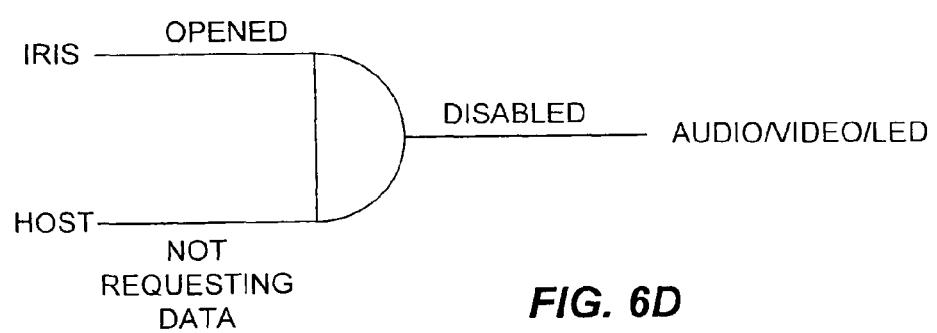

In accordance with one embodiment, and referring to FIGS. 6A-6D, the CPU 86 of FIG. 5 uses multiple events in order to decide whether or not to activate the audio/video subassembly 90. The events are associated with the iris subassembly 88 and the host device 72. An iris event informs the CPU 86 whether or not the iris is opened or closed. As should be appreciated, an opened iris allows video capture while a closed iris does not allow video capture. The host event comes in the form of a request for data or no request for data. As shown in FIG. 6A, the audio/video subassembly 90 is activated when the iris subassembly 88 is opened and the host device 72 is requesting data. As shown in FIG. 6B, the audio/video subassembly 90 is deactivated when the iris subassembly 88 is closed and the host device 72 is requesting data. As shown in FIG. 6C, the audio/video subassembly 90 is deactivated when the iris subassembly 88 is closed and the host device 72 is not requesting data. As shown in FIG. 6D, the audio/video subassembly 90 is deactivated when the iris subassembly 88 is opened and the host device 72 is not requesting data.

Figure 7:
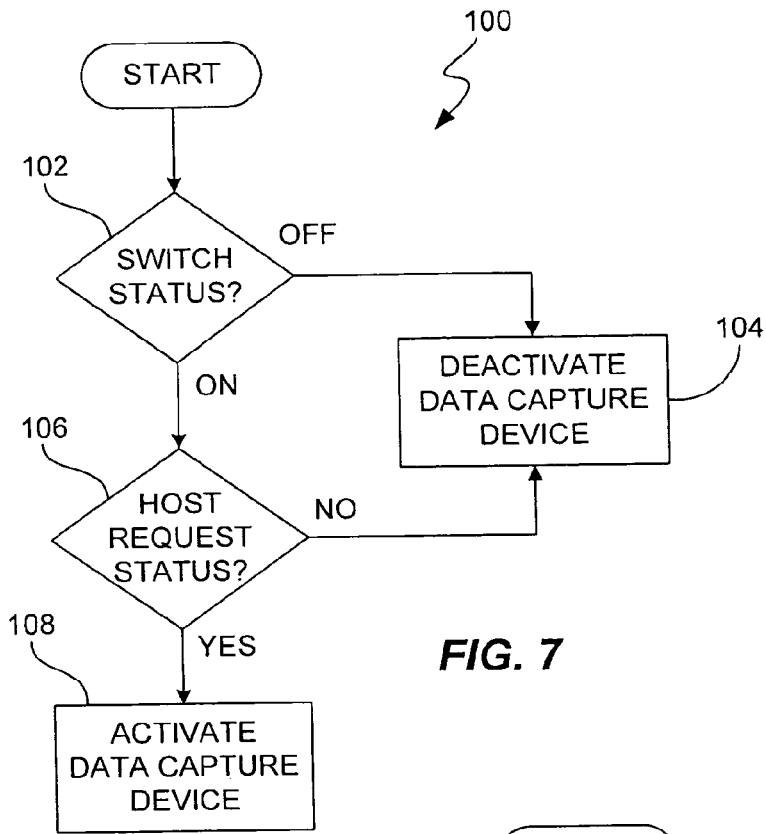
FIG. 7 is a flow diagram of a conferencing method, in accordance with one embodiment of the present invention.

FIG. 7 is a conferencing method 100, in accordance with one embodiment of the present invention. By way of example, the method 100 may be implemented by the audio/video capture device 70 of FIG. 5. The method 100 generally begins at block 102 where the status of a switch incorporated with an audio/video capture device is determined. The switch may be widely varied. For example, it may correspond to a mechanical, electrical or optical style switch. In one implementation, the switch corresponds to the iris subassembly. In another implementation, the switch corresponds to a button, dial or the like.

If the switch is in a first condition (e.g. iris closed), then the data capturing components are deactivated as shown in block 104. The deactivation is typically controlled by circuitry (e.g., controller, CPU) within of the audio/video capture device. When deactivated, the data capturing components of the audio/video capture device stop collecting data. In the case of FIG. 5, the audio/video subassembly 76 shuts down thus disabling the camera 84, microphone 86 and light emitting diode 88. When shut down, the camera 84 and microphone 86 stop capturing images and sound, respectively, and the light emitting diode 88 stops illuminating.

If the switch is in a second condition (e.g. iris opened), then the method 100 proceeds to block 106 where a status of the host device is determined. The status is typically determined by the CPU. If the host device is not requesting data, then the audio/video capture device deactivates the data capturing components as shown in block 104. If the host device is requesting data, then the process flow proceeds to block 108 where the CPU activates the data capturing components of the data capture device. When activated, the data capturing components begins to collect data. In the case of FIG. 5, the camera 94 and the microphone 96 collect images and sound respectively and the light emitting diode 98 illuminates. Furthermore, the CPU instructs the data capturing components to send the data to the requesting host device. If the host device is connected to a communication network, the data is broadcast to a selected location over the communication network. This is typically accomplished with the video conferencing software running on the host device, i.e., it transmits the information to a remote location. If the host device is not connected to the communication network, then the data is broadcast locally at the host device.

Figure 8:
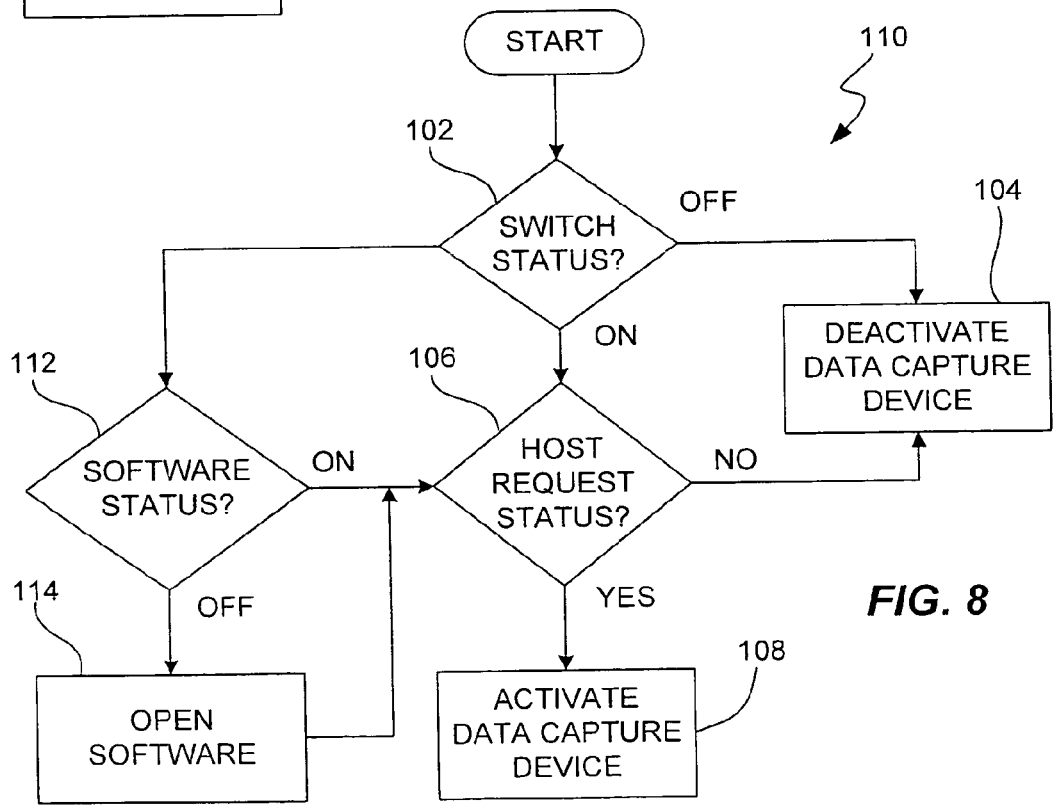
FIG. 8 is a flow diagram of a conferencing method, in accordance with another embodiment of the present invention.

FIG. 8 is a conferencing method 110, in accordance with another embodiment of the present invention. This embodiment is similar to the embodiment shown in FIG. 7, however, unlike the embodiment of FIG. 7, the embodiment of FIG. 8 further includes operations 112 and 114. The additional operations 112 and 114 pertain to an initiation sequence provided by the audio/video capture device. The initiation sequence begins when a determination is made as to the status of the switch. When the switch is closed, the method 110 proceeds to block 104. When the switch has been open continuously, the method 110 proceeds to block 106. When the condition of the switch has just changed from closed to open, the method 110 proceeds to block 112 where the status of the video conferencing software is determined. The status may be determined by the CPU of the audio/video capture device. If the software is opened, then the process flow proceeds to block 106. If the software is closed (shut down), then the process flow proceeds to block 114 where the software is opened. That is, the CPU of the audio/video capture device informs the host device to open (e.g., launch) the software. Following block 114, the method 110 proceeds back to block 106 where the status of the host is determined. In one embodiment, a request is automatically sent when the software is first opened. In another embodiment, a request is sent when the user makes a selection in the software to do so. After block 106, the method 110 proceeds to block 108 where the data capturing components are activated.

Figure 9:
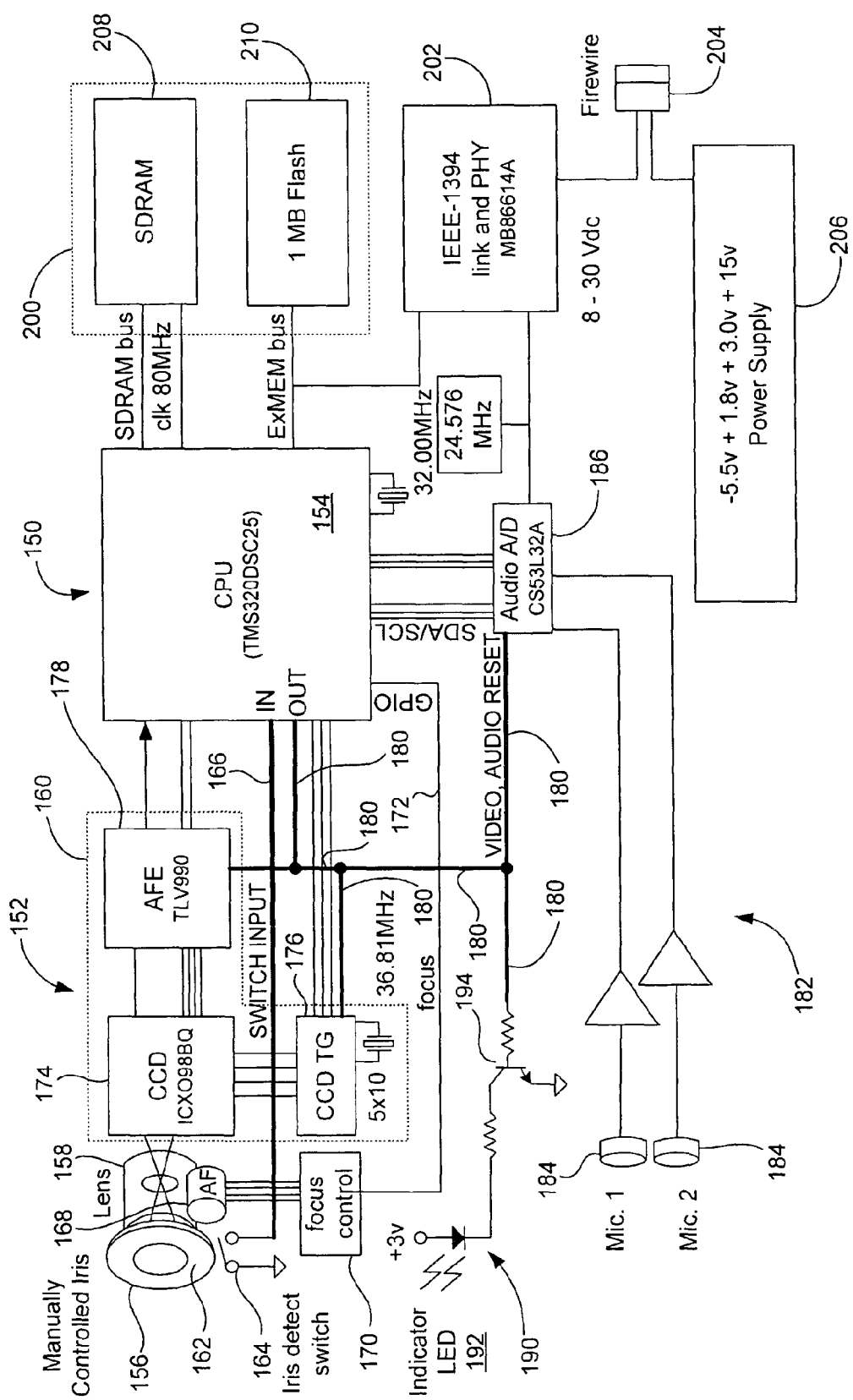
FIG. 9 is a circuit diagram of an audio/video capture device, in accordance with one embodiment of the present invention.

FIG. 9 is a circuit diagram of an audio/video capture device 150, in accordance with one embodiment of the present invention. The device 150 includes a camera unit 152 that is operatively coupled to a CPU 154. The camera unit 152 includes an iris assembly 156, a lens assembly 158 and a video (or image) capture assembly 160. The iris assembly 156 itself includes a manually controlled iris 162 and a detect switch 164. The detect switch 164 is configured to detect when the iris 162 is opened or closed. In one embodiment, the detect switch 164 is integral with the iris 162 (e.g., a single unit). The detect switch 164 may for example be an optical sensor that trips when a tab located on the manually controlled iris interrupts the optical signal of the optical sensor (e.g., photo interrupter). As shown, the switch 164 connects to an input (IN) on the CPU 154 via a switch input line 166. The CPU 154 can therefore determine the status of the switch (e.g., read by software).

The lens assembly 158 includes one or more lens that are controlled by an autofocus system having a motor 168 and a focus controller 170. The focus controller 170 is configured to control the motor 168, and the motor 168 is configured to move the lens so as to place the camera in focus. As shown, the focus controller 170 is connected to the CPU 154 via a GPIO line 172. Moving along, the video capture assembly 160 includes a charged coupled device (CCD) 174, a timing generator 176 and a video analog-to-digital (AD) converter 178. The CCD 174 is connected to the timing generator 176 and the video AD converter 178. The timing generator 176 is configured to generate timing signals for the CCD 174 and the CCD 174 is configured to capture images through the lens assembly 158. As shown, the timing generator 176 and the converter 178 are connected to the CPU 154 through various lines. In one particular embodiment, one of the lines includes an audio/video reset line 180. The audio/video reset line 180 couples the timing generator 176 and converter 178 to an audio/video reset output of the CPU 154 (OUT).

The device 150 also includes a microphone unit 182 that is operatively coupled to the CPU 154. The microphone unit 182 includes one or more microphones 184 and an audio analog-to-digital converter 186 that are connected together. In the illustrated embodiment, the microphone unit 182 includes a pair of microphones 184 configured to capture sound. As shown, the converter 186 is connected to the CPU 154 through various lines. In one particular embodiment, one of the lines includes the audio/video reset line 180. The audio/video reset line 180 couples the converter to the audio/video reset output of the CPU 154 (OUT).

The device also includes an indicator unit 190 that is operatively coupled to the CPU 154. The indicator unit 190 includes one or more "on air" indicators 192 and a controller 194 for controlling the indicators 192. In the illustrated embodiment, the indicator unit 190 includes a light emitting diode (LED) 192 that is configured to illuminate when the camera and microphone are active, and the controller 194 takes the form of a transistor. In the illustrated embodiment, the controller 194 is coupled to the audio/video reset output (OUT) of the CPU 154 via the audio/video reset line 180. In this embodiment, the LED 192 is not connected to the CPU 154 through any other lines (e.g., not separately connected to the CPU). The LED 192 only responds to signals generated through this line 180 and thus the LED 192 is "hard wired" to the other components connected to this line 180.

The CPU 154 is configured to output an audio/video reset signal from the audio/video reset output (OUT). The signal is generally controlled by software located on the CPU 154. The signal is configured to control (e.g., enable and disable) the components connected to the audio/video reset output (OUT). For example, the signal controls the timing generator 176, the video AD converter 178, the audio AD converter 186, and the LED 192. The signal generally has two conditions—active low and active high. When active low (e.g., software writes 0), the components connected to the output (OUT) are held in reset (e.g., idle). That is, they do not respond to inputs and they do not generate outputs (e.g., disabled). For example, the camera and microphone components do not respond to instructions from the CPU 154 and they do not produce audio or video signals. In addition, the LED 192 does not illuminate. As should be appreciated, because the LED 192 is hardwired to the other components through the audio/video reset line 180, the video and audio collection circuits are guaranteed to be in the reset state (off) when the LED is off. When active high (e.g., software writes 1), the components connected to the output (OUT) are pulled out of reset (e.g., active). That is, they are capable of responding to inputs and generating outputs (e.g., enabled). For example, the camera and microphone components respond to instructions from the CPU 154 and they can produce audio or video signals. In addition, the LED 192 illuminates to indicate that the device 150 is "on air".

The device 150 may also include memory 200, input/output controllers 202, data and power ports 204, power supplies 206 and the like. Each of these components may be widely varied. In the illustrated embodiment, the memory 200 consists of SDRAM 208 and flash memory 210. Furthermore, the I/O controller 202 includes an IEEE-1394 link (e.g. FireWire), and the port 204 corresponds to a FireWire port. As shown, the FireWire port 204 is connected to the power supply 206 and the I/O controller 202. The memory 200 and I/O controller 202 are connected to the CPU 154. The I/O controller 202 may also be connected to the audio AD converter 186.

Although the iris 162 is described as being manually controlled, it should be noted that this is not a limitation and that in some cases it may be desirable to have an iris 162 that is controlled by an actuator. The actuator would be configured to drive the iris 162 between the open and closed position. By way of example, the actuator may correspond to a motor system such as for example a system similar to the motor and controller used to move the lenses. In case such as these, the motor may be controlled by a separate switch or by a control system such as that provided by a host device. With regards to the later, the user may cause the iris 162 to open and close by initiating an action through software on the host device. For example, the software may provide an onscreen option as part of a graphical user interface (GUI) that when selected opens or closes the iris 162 via the motor. The onscreen option may be accessed directly at the host device or remotely from another device, as for example, through a network connection. Alternatively or additionally, the software may instruct the motor to open and close the iris when a user selects a predetermined button or key located on an input device or through voice recognition where the user simply states "open" or "close" (or the like).

The invention may be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may have one or more of the following advantages. One advantage of the invention is that the audio and video components are integrated into a single unit. As should be appreciated, multiple devices clutter the desktop, take up much needed connector space and add cost to the system. Another advantage of the invention is that an indicator is hard-wired to the audio and/or video components rather than being software controlled. As a result, users are provided with correct information concerning when data capture events are being performed, i.e., the information cannot be manipulated. Another advantage of the invention is that audio and/or video components include user controls thereon. In conventional video conferencing systems, a user can only control the system through the host device (e.g., computer) as for example via conferencing software running thereon. There are no switches on the audio or video components for performing control function such as pausing data transmissions or activating the conferencing system. Because the peripheral devices are slaves, they only respond to requests from the host device, they do not initiate requests to the host device.

While this invention has been described in terms of several preferred embodiments, there are alterations, permutations, and equivalents, which fall within the scope of this invention. By way of example, although the invention has been described in context of an LED being hardwired to a camera and a microphone, it may in fact only be hardwired to only one of these components. For example, it may only be hardwired to the camera. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. A single body video conferencing system, comprising:
a host device capable of processing and outputting a live stream of audio data, said host device including a user-operable switch;
software of the host device arranged to send requests for the live stream of audio data to the microphone; and
a microphone unit integrally coupled to the host device configured to capture the live stream of audio data when enabled comprising: a microphone and an indicator unit hard-wired to the microphone arranged to provide an affirmative indication that the microphone is truly on such that an end user cannot be misled into thinking that the microphone is off when in reality it is still on, wherein the microphone can only transmit said live stream of audio data to the host device when a user enables the user-operable switch mechanism and when the microphone is receiving the requests for the live stream of audio data from the software of the host device, thereby precluding an inadvertent transmission of said live stream of audio data.

2. The video conferencing system as recited in claim 1 wherein when the user closes the user-operable switch, the microphone stops data transmissions of said live stream of audio data from the microphone to the host device.

3. The video conferencing system as recited in claim 1 wherein when the switch enables the microphone to transmit said live stream of audio data to the host device, the host device launches an audio conference software application resident therein.

4. The video conferencing system as recited in claim 1 wherein the host device includes an indicator that is hard-wired to data collecting components of the microphone, the indicator providing operational indication to the user of the microphone when said live stream of audio data is being collected by the microphone.

5. The video conferencing system as recited in claim 1 further comprising:
a camera operatively coupled to the host device configured to capture a live stream of video data when enabled.

6. The video conferencing system as recited in claim 5 wherein the user-operable switch includes a user-operable iris mechanism of said camera, wherein the user enables the user-operable switch by opening the iris mechanism and disables the switch by closing the iris mechanism.

7. The video conferencing system as recited in claim 1 wherein the microphone is connected to an audio circuit arranged to convert the captured audio data into an audio signal that is passed to the host device.

8. The video conferencing system as recited in claim 6 wherein the iris mechanism is connected to a user-rotatable collar that opens the iris mechanism when rotated in a first direction and closes the iris mechanism when rotated in a second direction.

9. The video conferencing system as recited in claim 1, wherein said switch is a cap, button, dial, or key of said host device.

10. The video conferencing system as recited in claim 1, wherein said switch is implemented using input from a user selection of a screen interface of said host device or from a speech recognition input of said host device.

11. A computer-operated host device that combines multiple data collecting components into a single unit, comprising:
an image capture device configured to collect video data comprising: a camera and a camera indicator unit hard-wired to the camera arranged to provide an affirmative indication that the camera is truly on such that an end user cannot be misled into thinking that the camera is off when in reality it is still on; and
an audio capture device configured to collect a live stream of audio data comprising: a microphone and a microphone indicator unit hard-wired to the microphone arranged to provide an affirmative indication that the microphone is truly on such that an end user cannot be misled into thinking that the microphone is off when in reality it is still on, said host device having a user-operable switch configured to capture the live stream of audio data when enabled, wherein the audio and image capture devices can only transmit data to said host device when a user enables the user-operable switch and the audio capture device is receiving requests for the live stream of audio data from software of the host device, thereby precluding an inadvertent transmission of said live stream of audio data.

12. The host device as recited in claim 11 wherein the audio capture device, the image capture device and the microphone indicator unit are hard-wired such that they operate as a single unitary system.

13. The host device as recited in claim 12 wherein when the single unitary system is activated, the audio capture device collects said live stream of audio data, the image capture device collects said video data and the respective indicators unit indicate that the audio and image capture device are collecting data, and wherein when the single unitary system is deactivated the audio capture device does not collect said audio data, the image capture device does not collect said video data and said respective indicator unit indicates that the audio and image capture device are not collecting data.

14. The host device as recited in claim 11 wherein the audio capture device and the indicator unit are hard-wired together.

15. The host device as recited in claim 11 wherein the audio capture device includes one or more microphones.

16. The host device as recited in claim 11 wherein the indicator unit includes at least one auditory indicator, visual indicator or touch indicator.

17. The host device as recited in claim 11, wherein said user-operable switch includes a cap, button, dial, key, screen input or speech recognition input of said host device.

18. An audio conferencing host device configured as a single unit comprising:
- a user-operable switch;
- an audio capture device configured to capture a live stream of audio data, wherein the audio capture device can only transmit said live stream of audio data to said host device when the switch is enabled by a user and the audio capture device is receiving requests for said live stream of audio data from software of the host device, and wherein when the user disables the switch, the audio capture device stops data transmissions from the audio capture device to the host device; and
- an on-air indicator that is hard-wired to the audio capture device, the on air indicator informing the user when the audio capture device is transmitting said live stream of audio data to the host device.

19. The host device as recited in claim 18 wherein the on-air indicator is an auditory indicator or a visual indicator.

20. The host device as recited in claim 18 wherein the on-air indicator is a touch indicator.

21. The host device as recited in claim 18, wherein said user-operable switch is a cap, button, dial, or key of said host device.

22. The host device as recited in claim 18, wherein said user-operable switch is implemented using input from a user selection of a screen interface of said host device or from a speech recognition input of said host device.

23. A non-transitory computer readable medium for storing executable instructions executed by a processor in computer-operated host device that combines multiple data collecting components into a single unit, comprising:
- computer code for operating an image capture device configured to collect video data comprising: a camera and a camera indicator unit hard-wired to the camera, wherein the computer code for operating the image capture device causes the camera indicator to provide an affirmative indication that the camera is truly on such that an end user cannot be misled into thinking that the camera is off when in reality it is still on; and
- computer code for operating an audio capture device configured to collect a live stream of audio data comprising: a microphone and a microphone indicator unit hard-wired to the microphone, wherein the computer code for operating the audio capture device causes the microphone indicator to provide an affirmative indication that the microphone is truly on such that an end user cannot be misled into thinking that the microphone is off when in reality it is still on, said host device having a user-operable switch configured to capture the live stream of audio data when enabled, wherein the audio and image capture devices can only transmit data to said host device when a user enables the user-operable switch and the audio capture device is receiving requests for the live stream of audio data from software of the host device, thereby precluding an inadvertent transmission of said live stream of audio data.

24. The computer readable medium as recited in claim 23 wherein the audio capture device, the image capture device and the microphone indicator unit are hard-wired such that they operate as a single unitary system.

25. The computer readable medium as recited in claim 24 wherein when the single unitary system is activated, the audio capture device collects said live stream of audio data, the image capture device collects said video data and the respective indicators unit indicate that the audio and image capture device are collecting data, and wherein when the single unitary system is deactivated the audio capture device does not collect said audio data, the image capture device does not collect said video data and said respective indicator unit indicates that the audio and image capture device are not collecting data.

26. The computer readable medium as recited in claim 23 wherein the audio capture device and the indicator unit are hard-wired together.

27. The computer readable medium as recited in claim 23 wherein the audio capture device includes one or more microphones.

28. The computer readable medium as recited in claim 23 wherein the indicator unit includes at least one auditory indicator, visual indicator or touch indicator.

29. The computer readable medium as recited in claim 23, wherein said user-operable switch includes a cap, button, dial, key, screen input or speech recognition input of said host device.

* * * * *